(12) United States Patent
Rouchy et al.

(10) Patent No.: US 9,169,148 B2
(45) Date of Patent: Oct. 27, 2015

(54) LOW NOX MIXED INJECTOR

(75) Inventors: Patrice Rouchy, Vaucresson (FR); Laurent Garnier, Saint Martin en Bresse (FR); Joseph Vernaz, Vaux en Bugey (FR); Carlos Mazzotti De Oliveira, Jundai-Sao Paulo (BR)

(73) Assignees: SAINT-GOBAIN EMBALLAGE, Courbevoie (FR); SAINT-GOBAIN GLASS FRANCE, Courbevoie (FR)

( * ) Notice: Subject to any disclaimer, the term of this patent is extended or adjusted under 35 U.S.C. 154(b) by 1225 days.

(21) Appl. No.: 12/599,575

(22) PCT Filed: May 6, 2008

(86) PCT No.: PCT/FR2008/050796
§ 371 (c)(1),
(2), (4) Date: Jan. 21, 2010

(87) PCT Pub. No.: WO2008/148994
PCT Pub. Date: Dec. 11, 2008

(65) Prior Publication Data
US 2010/0304314 A1 Dec. 2, 2010

(30) Foreign Application Priority Data

May 10, 2007 (FR) ...................................... 07 54969

(51) Int. Cl.
*F23D 11/10* (2006.01)
*C03B 5/235* (2006.01)
(Continued)

(52) U.S. Cl.
CPC . *C03B 5/235* (2013.01); *F23C 5/08* (2013.01); *F23D 17/002* (2013.01); *B05B 7/066* (2013.01); *F23D 11/105* (2013.01); *F23R 3/14* (2013.01); *F23R 3/36* (2013.01)

(58) Field of Classification Search
CPC .............. F23C 5/08; F23C 7/004; F23C 1/08; F23C 1/10; F23C 1/12; F23D 17/002; F23D 11/105; B05B 7/066; F23R 3/14; F23R 3/36; Y02E 20/344

USPC ................... 431/2, 185, 12; 60/39.463, 742; 239/403
IPC .. F23D 11/10,11/12, 11/36, 17/00; C03B 5/235
See application file for complete search history.

(56) References Cited

U.S. PATENT DOCUMENTS 1,510,039 A * 9/1924 Canfield ........................ 239/403
1,881,359 A * 10/1932 Jones ............................. 239/400
(Continued)

FOREIGN PATENT DOCUMENTS

EP          0 921 349           6/1999
FR          2772117 A1 *        6/1999    .............. F23D 11/10
(Continued)

OTHER PUBLICATIONS

"FR_2834774_A1_I-MT.pdf", Machine translation—FR-2834774, EPO, Jun. 17, 2012.*
(Continued)

*Primary Examiner* — Gregory Huson
*Assistant Examiner* — Daniel E Namay
(74) *Attorney, Agent, or Firm* — Oblon, McClelland, Maier & Neustadt, L.L.P.

(57) ABSTRACT

The invention relates to
 a combustion method for glass melting, in which a flame is created both by a liquid fuel pulse and a single gaseous fuel pulse, characterized in that the fraction of the total power due to the liquid fuel varies between 20 and 80%, and in that the specific gaseous fuel pulse is limited to a value that is sufficiency low so that the NOx content of the flue gases produced does not exceed 800 mg/Sm$^3$ for a cross-fired furnace and 600 mg/Sm$^3$ for an end-fired furnace;
 an injector for implementing this method;
 a burner comprising one or more such injectors;
 a furnace comprising at least one such burner.

9 Claims, 1 Drawing Sheet

(51) Int. Cl.
*F23C 5/08* (2006.01)
*F23D 17/00* (2006.01)
*B05B 7/06* (2006.01)
*F23R 3/14* (2006.01)
*F23R 3/36* (2006.01)

(56) References Cited

U.S. PATENT DOCUMENTS

| | | | | |
|---|---|---|---|---|
| 1,953,590 | A * | 4/1934 | Cone | 431/185 |
| 1,971,328 | A * | 8/1934 | Byrne et al. | 431/185 |
| 3,032,096 | A * | 5/1962 | Stoul | 431/283 |
| 3,255,966 | A * | 6/1966 | Hoffert et al. | 239/132.3 |
| 3,266,552 | A * | 8/1966 | Denis | 239/430 |
| 3,297,411 | A * | 1/1967 | Dear | 422/158 |
| 3,693,883 | A * | 9/1972 | Stigger | 239/423 |
| 3,777,983 | A * | 12/1973 | Hibbins | 239/422 |
| 4,017,253 | A * | 4/1977 | Wielang et al. | 432/58 |
| 4,035,133 | A * | 7/1977 | Larcen | 431/12 |
| 4,480,559 | A * | 11/1984 | Blaskowski | 110/347 |
| 4,566,268 | A | 1/1986 | Hoffeins et al. | |
| 4,664,619 | A * | 5/1987 | Johnson et al. | 431/154 |
| 4,865,542 | A * | 9/1989 | Hasenack et al. | 431/160 |
| 4,996,837 | A * | 3/1991 | Shekleton | 60/804 |
| 5,022,849 | A * | 6/1991 | Yoshii et al. | 431/2 |
| 5,112,216 | A * | 5/1992 | Tenn | 431/5 |
| 5,439,532 | A * | 8/1995 | Fraas | 136/253 |
| 5,743,723 | A * | 4/1998 | Iatrides et al. | 431/8 |
| 5,782,626 | A * | 7/1998 | Joos et al. | 431/8 |
| 5,873,524 | A * | 2/1999 | Bodelin et al. | 239/8 |
| 6,142,764 | A * | 11/2000 | Anderson et al. | 431/8 |
| 6,190,158 | B1 * | 2/2001 | Legiret et al. | 431/8 |
| 6,199,368 | B1 * | 3/2001 | Onoda et al. | 60/39.463 |
| 6,244,524 | B1 | 6/2001 | Tackels et al. | |
| 6,439,140 | B2 * | 8/2002 | Mukai et al. | 110/347 |
| 6,551,095 | B2 * | 4/2003 | Tackels et al. | 431/8 |
| 6,796,794 | B2 * | 9/2004 | Takemura et al. | 431/353 |
| 7,165,405 | B2 * | 1/2007 | Stuttaford et al. | 60/737 |
| 7,406,827 | B2 * | 8/2008 | Bernero et al. | 60/742 |
| 7,506,822 | B2 * | 3/2009 | Cairo et al. | 239/1 |
| 7,717,701 | B2 * | 5/2010 | D'Agostini et al. | 431/9 |
| 8,113,824 | B2 * | 2/2012 | Sarv et al. | 431/182 |
| 8,239,114 | B2 * | 8/2012 | Goeke et al. | 701/100 |
| 8,607,572 | B2 * | 12/2013 | Koizumi et al. | 60/746 |
| 2001/0007737 | A1 * | 7/2001 | Tackels et al. | 431/8 |
| 2006/0281036 | A1 | 12/2006 | Sarv | |
| 2007/0231761 | A1 * | 10/2007 | Rosen et al. | 431/350 |
| 2008/0020334 | A1 * | 1/2008 | Joshi et al. | 431/2 |
| 2009/0208889 | A1 * | 8/2009 | Pillard | 431/182 |
| 2010/0081098 | A1 * | 4/2010 | D'Agostini et al. | 431/5 |
| 2010/0112498 | A1 * | 5/2010 | Rouchy et al. | 431/2 |

FOREIGN PATENT DOCUMENTS

| | | | | |
|---|---|---|---|---|
| FR | 2 834 774 | | 7/2003 | |
| FR | 2834774 | A1 * | 7/2003 | F23D 17/00 |
| FR | 2915989 | A1 * | 11/2008 | C03B 5/235 |
| GB | 257 416 | | 9/1926 | |
| GB | 257416 | A * | 9/1926 | F23D 17/00 |
| JP | 09189406 | A * | 7/1997 | F23D 11/24 |
| JP | 10103616 | A * | 4/1998 | F23C 11/00 |
| JP | 11108308 | A * | 4/1999 | F23C 11/00 |
| JP | 11237008 | A * | 8/1999 | F23D 11/12 |
| JP | 2002213746 | A * | 7/2002 | F23R 3/28 |
| JP | 2007308312 | A | 11/2007 | |
| JP | 2008089298 | A | 4/2008 | |
| WO | WO 9855800 | A1 * | 12/1998 | F23D 11/10 |
| WO | WO 2007000512 | A1 * | 1/2007 | F23C 7/00 |

OTHER PUBLICATIONS

"WO_2007000512_A1_M-Mach Trans.pdf"; Machine translation for WO_2007000512_A1_M-Mach Trans.pdf; http://www.epo.org; Nov. 25, 2014.*

* cited by examiner

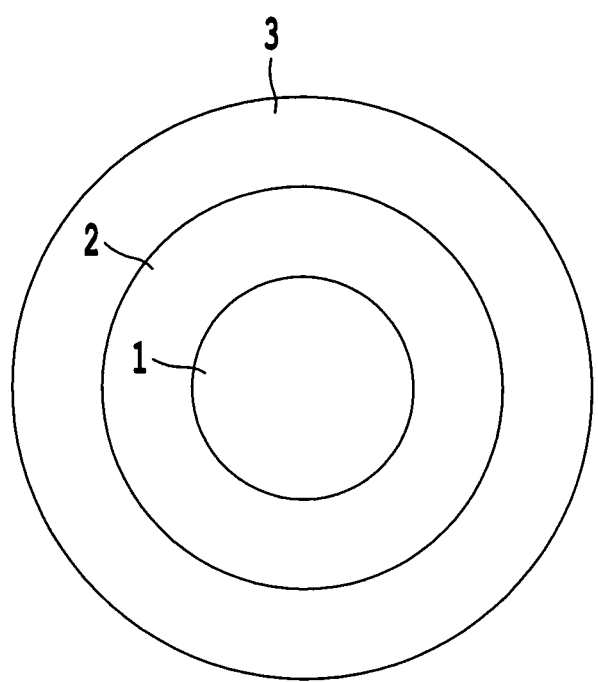

LOW NOX MIXED INJECTOR

The invention relates to a combustion method and device in which the fuel feed is provided by at least one injector.

The invention is described more particularly for use in glass melting furnaces, in particular furnaces for making float glass or furnaces for making holloware, for example furnaces operating with inversion such as those using regenerators (for energy recovery), but it is not necessarily limited to such applications.

Most combustion methods of the abovementioned type, in particular those used in glass furnaces, are faced with problems of undesirable NOx emissions in the flue gases.

NOx have a harmful impact on both human beings and the environment. On the one hand, $NO_2$ is an irritant gas and the cause of respiratory diseases. On the other hand, in contact with the atmosphere, they can progressively form acid rain. Finally, they generate photochemical pollution because in combination with volatile organic compounds and solar radiation, NOx cause the formation of ozone called tropospheric ozone, whereof the increased concentration at low altitude is harmful to humans, especially in periods of extreme heat.

This is why the standards in force on NOx emissions are becoming increasingly stringent. Due to the very existence of these standards, furnace manufacturers and operators, like those of glass melting furnaces, are constantly concerned to minimize NOx emissions, preferably to a level lower than 800 mg per $Sm^3$ of flue gas for a cross-fired furnace, or lower than 600 mg per $Sm^3$ of flue gas for an end-fired furnace.

The parameters affecting NOx formation have already been investigated. They are essentially the temperature, because above 1300° C., NOx emission increases exponentially, and excess air since the NOx concentration varies with the square root of the oxygen concentration or even of the $N_2$ concentration.

Many techniques have already been proposed for reducing NOx emissions.

A first technique is to use a reducing agent on the emitted gases so that the NOx are converted to nitrogen. The reducing agent may be ammonia, but this causes drawbacks such as the difficulty of storing and handling such a product. It is also possible to use a natural gas as reducing agent, but this is done to the detriment of the consumption of the furnace and increases the $CO_2$ emissions. The presence of reducing gases in certain parts of the furnace, such as the regenerators, can also cause accelerated corrosion of the refractories in these zones.

It is therefore preferable, without being mandatory, to discard this technique and adopt measures called primary measures. These measures are so called because the aim is not to destroy the NOx already formed, as in the technique described above, but rather to prevent their formation, in the flame for example. These measures are also simpler to apply and, in consequence, more economical. They may however not substitute completely for the abovementioned technique, but advantageously supplement it. In any case, these primary measures are an indispensable prerequisite for decreasing the reactant consumption of the secondary measures.

Existing measures can be classed in a non-limiting manner in several categories:

a first category consists of reducing the formation of NOx using the "reburning" technique, whereby a low air zone is created in the combustion chamber of a furnace. This technique has the drawback of increasing the temperature in the regenerator stacks and, if necessary, requiring a specific design of the regenerators and their stacks, particularly in terms of leaktightness and corrosion resistance;

a second category consists in acting on the flame by reducing or preventing the formation of NOx therein. For this purpose, it is possible for example to try to reduce the excess combustion air. It is also possible to seek to limit the temperature peaks by maintaining the flame length, and by increasing the volume of the flame front to reduce the average temperature in the flame. Such a solution is described for example in U.S. Pat. No. 6,047,565 and WO 9 802 386. It consists of a combustion method for glass melting, in which the fuel feed and the oxidizer feed are both designed to spread the fuel/oxidizer contact time and/or to increase the volume of this contact to reduce the emission of NOx.

Note that one injector is dedicated to propulsion of the fuel, which is to be burned by an oxidizer. Thus, the injector may form part of a burner, the term burner generally designating the device comprising both the fuel inlet and the oxidizer inlet.

In order to reduce NOx, EP 921 349 (or U.S. Pat. No. 6,244,524) proposed a burner equipped with at least one injector, comprising an inlet duct for liquid fuel, such as fuel oil, and an inlet duct for spray fluid placed concentrically about the said liquid fuel inlet duct, the said liquid fuel inlet duct comprising an element perforated with oblique channels to place the liquid fuel in the form of a hollow jet substantially matching the inside wall, the generatrix of each of the said channels making an angle of at least 10° with the liquid fuel inlet direction.

FR 2 834 774 proposes to reduce NOx by using a burner equipped with at least one injector comprising three coaxial fuel inlet ducts.

liquid, high pressure gas, low pressure gas, mentioned in the order of increasing distance from the axis. With this injector, however, the maintenance of a low NOx emission when the relative proportions of the various fuels are to be varied requires complex settings.

It is the object of the invention to provide a method of heat treatment for molten glass in which fuels of different types are used, of which the relative proportions vary broadly, while maintaining a low NOx emission.

For this purpose, the invention relates to a combustion method for glass melting, in which a flame is created both by a liquid fuel pulse and a single gaseous fuel pulse, characterized in that the fraction of the total power due to the liquid fuel varies between 20 and 80%, and in that the specific gaseous fuel pulse is limited to a value that is sufficiently low so that the NOx content of the flue gases produced does not exceed 800 mg/$Sm^3$ for a cross-fired furnace and 600 mg/$Sm^3$ for an end-fired furnace.

It has in fact been confirmed that the combustion of a liquid fuel pulse (such as fuel oil) and a single pulse of low pressure gas allowed the maintenance of low NOx without requiring complex settings or adjustments. Thus, for example, the fuel oil/gas proportion can be modified very easily at will, particularly in response to fluctuations in the cost of these fuels.

The inventive method serves to obtain NOx emissions as low as with the use of fuel oil as the sole fuel.

The FIGURE, which is not to scale, shows the general relationship between a liquid fuel inlet duct (1) circumscribed in a coaxial fluid inlet duct (2) for spraying the liquid fuel, itself circumscribed in a single coaxial gaseous fuel inlet duct (3).

The combustion power is broken down here exclusively into power due to the liquid fuel, on the one hand, gaseous fuel on the other hand, so that the share of the latter is the complement of that of the former to 100% (that is varying between 80 and 20%).

The specific gaseous fuel pulse is preferably equal to 3, and particularly preferably to 2.5 N/MW.

Note that in the glass industry concerned by the present invention, an end-fired furnace can operate alternately with two burners located in the left, respectively right part of the furnace. The power of the burners is equal to the product of the number of injectors (particularly two or three) that they comprise multiplied by the power of one injector.

The power of the burners (and consequently the number of injectors per burner, and the power of the injectors) is variable and must be adapted particularly to the size of the furnace.

For information, a furnace of about a hundred m² (area of the melt) can operate with two alternating burners with a power of 8-14 MW each. If these burners comprise two injectors each, the power thereof is 4-7 MW, broken down into a share of power of the injector due to liquid fuel, and a share due to gaseous fuel.

The abovementioned maximum specific pulse of gaseous fuel is related to this latter share. The maintenance of this specific gaseous fluid pulse at such relatively low values serves to vary the relative proportions of the liquid and gaseous fuels broadly, while keeping the NOx emissions low.

The adjustment of this specific pulse can be made very easily by selecting the diameter of the gaseous fuel inlet duct. It suffices to increase this diameter to decrease the specific pulse, all other parameters remaining equal, and vice versa.

According to another advantageous feature of the inventive method, the specific liquid fuel pulse is not higher than 1 N/MW. These values relate only to the contribution of the liquid fuel to the power of an injector. They are adapted to the flame lengths and optimal combustion power, in all the dimensions and configurations of glass industry or equivalent furnaces. They also obviously guarantee the NOx emissions contained to the desired low level.

The adjustment of the specific liquid fuel pulse is also easy and takes place like that of the specific gaseous fuel pulse. Increasing the diameter of the inlet duct (nozzle) of the liquid fuel decreases the specific pulse thereof, all the other parameters being equal, and vice versa.

The invention also relates to an injector for implementing a method described above, characterized in that it comprises a liquid fuel inlet duct circumscribed in a coaxial fluid inlet duct for spraying the liquid fuel, itself circumscribed in a single coaxial gaseous fuel inlet duct. This injector construction can result from the elimination of the coaxial high pressure gas inlet duct placed between the coaxial liquid fuel inlet and liquid fuel spray fluid ducts on the one hand, and the coaxial low pressure gas inlet duct on the other hand, in the injector described in document FR 2 834 774. The inlet ducts here also have the function of expelling the fluids.

Preferably, the liquid fuel inlet duct comprises an element perforated with oblique channels to place the liquid fuel in the form of a hollow rotating jet before ejection from the injector, the generatrix of each of the channels forming and making an angle of 2 to 30° with the liquid fuel inlet direction. This feature is known in particular from document EP 921 349. The liquid fuel is divided in as many individual jets as the number of oblique channels.

The uniform distribution of the oblique channels and the 2 to 30° inclination of the generatrix of each of these channels on the entire circumference of the liquid fuel inlet duct have the consequence of a centrifugation of all the individual jets, without them necessarily interfering with one another.

This centrifugation contributes downstream to making the fuel take a helicoidal trajectory by being placed in the form of a hollow jet matching the inside wall of the inlet duct.

At the outlet thereof, the liquid fuel has thus acquired a maximum mechanical energy and, under the influence of the spray fluid, it bursts into droplets having an optimal size dispersion.

In a particularly advantageous embodiment of the injector of the invention, the inlet ducts for liquid fuel and for liquid fuel spray fluid are removable for 100%; gas operation. These ducts can form an integrated, lightweight assembly, which is easy to dismantle from the injector, and to mount thereon. Once this assembly is removed from the injector, the latter can operate completely with gaseous fuel. At the location left free by removing the fuel oil line, the high pressure gas exits. The low pressure gas continues to pass through the outer ring.

Other objects of the invention are:
a burner comprising one or more injectors defined above;
a furnace comprising at least one such burner, in particular an end-fired furnace or a cross-fired furnace.

The invention is now illustrated by the example below.

EXAMPLE

A 95 m² (area of the glass melt) end-fired furnace is equipped with two burners located in the left, respectively right hand part of the furnace.

One burner comprises an air inlet jet under which two injectors are placed for liquid fuel heated to 130° C. and natural gas. The power of a burner is 13 MW.

The fuel oil inlet duct of the injector is circumscribed in a coaxial duct for air inlet (2 bar) for spraying the fuel oil.

The spray air inlet duct is circumscribed in a coaxial natural gas inlet duct.

The specific fuel oil pulse $I_{spe(f)}$, related to the fuel oil power of a single injector, depends on the nozzle of the fuel inlet duct. The values $I_{spe(f)}$ are given in the table below. The capacity of an injector is half of the capacity of a burner (that is 6.5 MW), and is broken down into the sum of the fuel oil capacity and the gas capacity of an injector.

The specific gas pulse $I_{spe(g)}$, related to the gas capacity of a single injector, depends on the diameter of the gas inlet duct. The values $I_{spe(g)}$ are given in the table below.

The fuel oil inlet duct contains an element for rotating the fuel oil comprising holes, of which the axis makes an angle of 2 to 30° with the fuel oil inlet direction.

The relative gas and fuel oil capacities are varied in the same way, for each configuration given in the table below, for both injectors of the two burners. The relative fuel oil capacity is given in the table in % (f).

For each configuration, the NOx emissions are given for a reasonable CO value with regard to corrosion of the refractories.

TABLE

| Configuration No. | % (f) | $I_{spe(f)}$ (N/MW) | $I_{spe(g)}$ (N/MW) | NOx (mg/Nm³) |
|---|---|---|---|---|
| 1 | 70 | 0.54 | 0.91 | 570 |
| 2 | 50 | 0.53 | 1.51 | 575 |
| 3 | 30 | 0.53 | 2.05 | 580 |
| 4 | 30 | 0.53 | 0.64 | 530 |
| 5 | 17 | 0.51 | 0.75 | 560 |
| 6 | 74 | 0.56 | 0.76 | 510 |

Configurations 1 and 3 are compared.

Increasing proportions of gas are tested, known as producing more NOx than fuel oil. This is clearly observed.

The nozzle (f) is varied to maintain a practically constant value $I_{spe(f)}$, this value corresponding to an optimal flame length for the furnace concerned.

Having kept the same gas nozzle diameter, an increasing specific gas pulse is observed, corresponding to an increasing gas flow rate.

Configurations 3 and 4 are compared.

The NOx emissions have successfully been decreased with a larger diameter gas nozzle, lowering the value of $I_{spe(g)}$ from 2.05 to 0.64 N/MW.

However, the flame control is better, and the flame is less voluminous with the value $I_{spe(g)}$ of 2.05 in comparison with 0.64 N/MW.

Configurations 5 and 6 are compared.

It is again observed that the increase in the fuel oil capacity decreases the NOx emissions. This is checked independently of the specific pulses, which are kept constant by changing the values of the nozzle (f) and the diameter (g).

Thus the invention serves to limit the NOx emissions to less than 600 mg/Sm³ for an end-fired furnace (800 mg/Sm³ for a cross-fired furnace), by the combustion of a liquid fuel pulse and a relatively low gas fuel pulse.

The invention claimed is:

1. A combustion method comprising igniting a liquid fuel pulse and a single gaseous fuel pulse ejected from an injector to create a flame, wherein
    the fraction of the total power due to the liquid fuel varies between 20 and 80%, and the specific gaseous fuel pulse is not more than 3 N/MW,
    the NOx content of the fuel gases produced does not exceed 800 mg/Sm³ for a cross-fired furnace and 600 mg/Sm³ for an end-fired furnace,
    the injector comprises a duct system that consists of a liquid fuel inlet duct, a coaxial fluid inlet duct, and a single coaxial gaseous fuel inlet duct,
    the liquid fuel inlet duct is circumscribed in the coaxial fluid inlet duct, and the coaxial fluid inlet duct is itself circumscribed in the single coaxial gaseous fuel inlet duct.

2. The method according to claim 1, wherein the specific liquid fuel pulse is not more than 1 N/MW.

3. The method of claim 1, wherein the injector is contained in a burner which is itself enclosed in a furnace, wherein the furnace comprises two burners on one side thereof.

4. The method of claim 3, wherein each burner comprises two injectors.

5. The method of claim 4, wherein each injector operates at a power of from 4-7 MW.

6. The method of claim 1, wherein each injector operates at a power of from 8-14 MW.

7. The method of claim 1, wherein the specific gaseous fuel pulse is adjusted by changing the diameter of the gaseous fuel inlet duct.

8. The method of claim 1, wherein the liquid fuel inlet duct comprises an element perforated with oblique channels to place the liquid fuel in the form of a hollow rotating jet before ejection from the injector.

9. The method of claim 8, wherein each of the channels comprises a generatrix that makes an angle of 2 to 30° with the liquid fuel inlet direction.

* * * * *